Dec. 29, 1925.
N. W. MILLER
ATTACHMENT FOR SEEDING MACHINES
Filed June 2, 1924
1,567,536
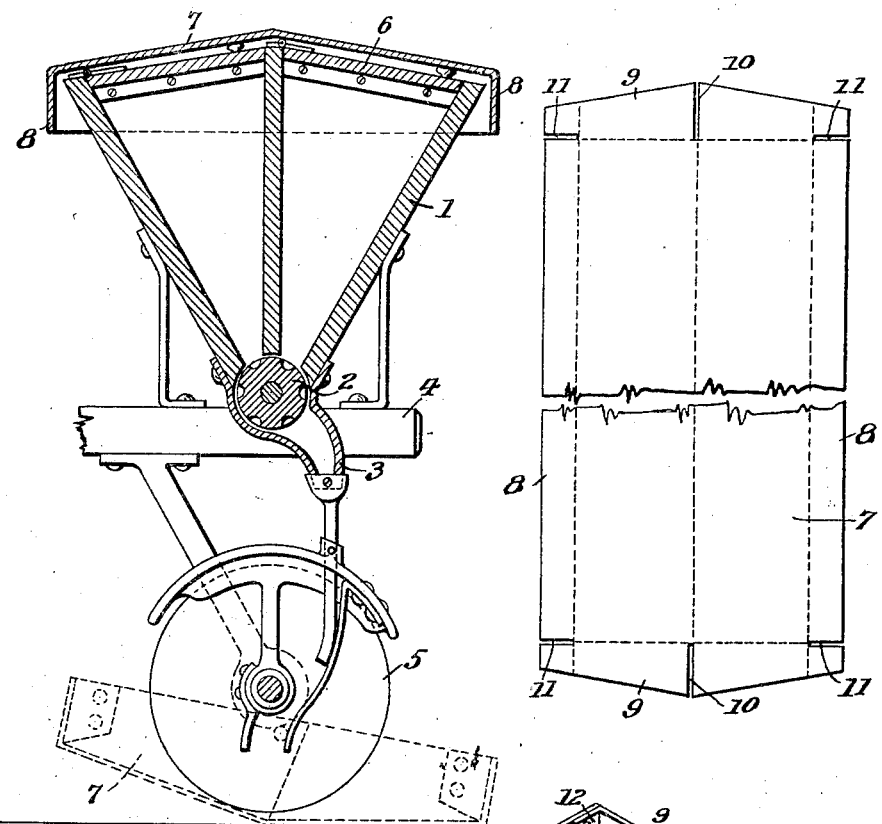
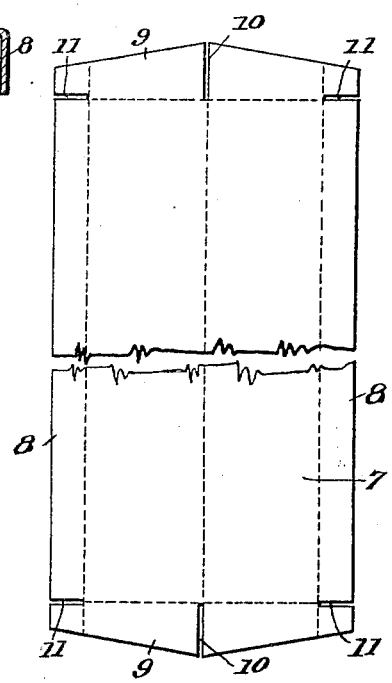
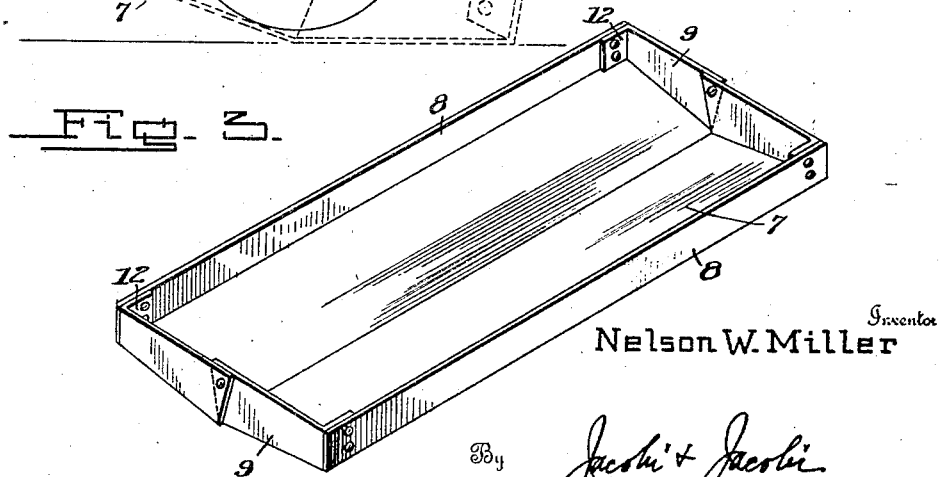
Inventor
Nelson W. Miller
By Jacobi & Jacobi
Attorneys Patented Dec. 29, 1925.

1,567,536

UNITED STATES PATENT OFFICE.

NELSON W. MILLER, OF TIFFIN, OHIO.

ATTACHMENT FOR SEEDING MACHINES.

Application filed June 2, 1924. Serial No. 717,422.

*To all whom it may concern:*

Be it known that NELSON W. MILLER, a citizen of the United States, residing at Tiffin, in the county of Seneca and State of Ohio, has invented certain new and useful Improvements in Attachments for Seeding Machines, of which the following is a specification.

This invention relates to new and useful improvements in attachments for seeding machines, and more particularly to attachments for use in connection with grain drills, the primary object of the invention being to provide a removable cover or roofing for the hopper so as to protect the contents of the latter from damp and rainy weather.

A still further object resides in providing a cover which may be applied to use and permitted to remain in position during the operation of the machine without interfering therewith in any manner whatsoever, the cover being of such construction as to fit properly in position over the hopper and adapted for ready removal therefrom.

Still another object of the invention resides in providing a device of this character which may be quickly and readily removed and inverted and placed under the machine to form a trough or pan for catching or collecting the grain or seed when cleaning the device.

A still further object resides in providing a device of this character which is simple and durable in construction, inexpensive to manufacture and one which will be very efficient and useful in operation.

Other objects and advantages of this invention will become apparent during the course of the following description.

In the accompanying drawing forming a part of this specification and in which like numerals designate like parts throughout the same:—

Figure 1 is a vertical section through a seed or grain drill showing my device applied to use thereon;

Figure 2 is a plan view of the blank from which the cover or roof is formed; and Figure 3 is a perspective view of the device removed and in the position of a trough.

In describing the invention I shall refer to the drawing in which 1 designates a hopper of any preferred size and shape, but in the drawing I have illustrated the same as having tapered side walls provided with a central partition to provide two compartments. These compartments lead to a rotary seed dropping member 2 which conducts the seed, grain and fertilizer from the compartments into a feed conduit 3, the latter leading to a point adjacent the ground. This hopper is carried or supported in any preferred manner on the frame 4 of the machine and rotary disks 5 are provided for assisting in the drilling of the seed.

As stated, any preferred shape or form of hopper may be provided as this forms no particular part of my invention but, as illustrated the hopper is covered by two hinged top sections 6, the hinged ends being connected with the central partition in the hopper and said top sections are inclined outwardly and downwardly toward the side walls of the hopper.

It is a well known fact that in the use of devices of this character rain and dampness enters the hopper when the machine is left in the field over night, and in many instances the hoppers and the seed and grain are seriously damaged thereby, as well as the fertilizer becoming cemented and clogging the fertilizer attachment of the drill. My invention contemplates the provision of a means to protect the seed, grain and fertilizer within the hopper when the machine is left standing in the field continuously.

To this end I provide a cover or roof 7 which may be of any desired size and shape to fit the top of the hopper 1. This cover 7 is formed preferably of galvanized iron or other similar metal, and as the usual hoppers in seeding machines are of the shape disclosed in Fig. 1 of the drawing, I prefer to design my cover to conform to that construction. This cover is formed from a single blank of metal bent along a central longitudinal line to form downwardly inclined portions substantially to the inclination of the top leaves 6 of the hopper. The side edges of the blank are bent downwardly along longitudinal lines to form side flanges 8 and the ends of the blank are bent downwardly to form end flanges 9. The blank is is slit on a median line longitudinally from its end edges to the bends therein forming the flanges 9, the slits being designated as 10 and said flanges are tapered laterally from the slit portions thereof towards their outer ends as clearly shown in Fig. 2. The blank is also slit from its side edges inwardly along the lines upon which the flanges 9 are bent, the latter slits being designated as 11. By slitting the blank as shown at 10, the adjacent ends of the end flanges 9 may be overlapped and riveted together, as shown in Fig. 3, so that the free edges of the sections of said flanges will be in longitudinal alignment and by slitting the blank as shown at 11 and bending the same inwardly as shown in Fig. 3, lugs 12 are formed on the end flanges 9 which afford means whereby the same may be readily riveted, soldered, or otherwise secured to the side flanges 8. A complete cover or roof is thus formed for the hopper 1 and this cover or roof may be made in various sizes to fit over various sizes of hoppers, as may be desired, the same protecting the contents of the hopper against rain and dampness.

As stated in the objects of the invention, my improved device contemplates use not only as a cover or protection for the hopper and its contents, but also as a pan or trough for catching the grain when it is desired to clean the hopper and other portions of the machine through which the seed or grain travels. As shown in dotted lines in Fig. 1, the cover or roof 8 may be removed from the top of the hopper and placed on the ground in inverted position, thereby forming a pan or trough which will obviously collect the grain, seed or fertilizer as it is dropped from the hopper through the conduit 3. Frequently it is desired to remove the grain, seed or fertilizer from one of the compartments of the hopper, and this can be readily accomplished and the contents collected by placing the cover on the ground as shown in dotted lines in Fig. 1, so as to form a trough. It will thus be seen that my improved device performs a double function in that in one position it constitutes a roof or cover for the hopper to protect the contents thereof, while in its other position it constitutes a pan or trough for the collection of the grain, seed or fertilizer when it is desired to remove the same from the hopper.

From the foregoing description of the construction of my improved device, it will be seen that I have provided a simple, inexpensive, and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:—

An auxiliary cover for seed drill hoppers comprising a sheet metal blank bent on a central longitudinal line to provide oppositely inclined roof panels, each of said roof panels being provided with a longitudinal side flange and end flanges, the adjacent ends of said end flanges at each end of said cover being overlapped and secured in fixed relation and means for connecting the end flanges with said longitudinal flanges.

In testimony whereof I affix my signature.

NELSON W. MILLER.